May 8, 1962 A. G. STIMSON ET AL 3,033,093
AUTOMATIC EXPOSURE CONTROL SYSTEM
Filed June 30, 1958 3 Sheets-Sheet 1
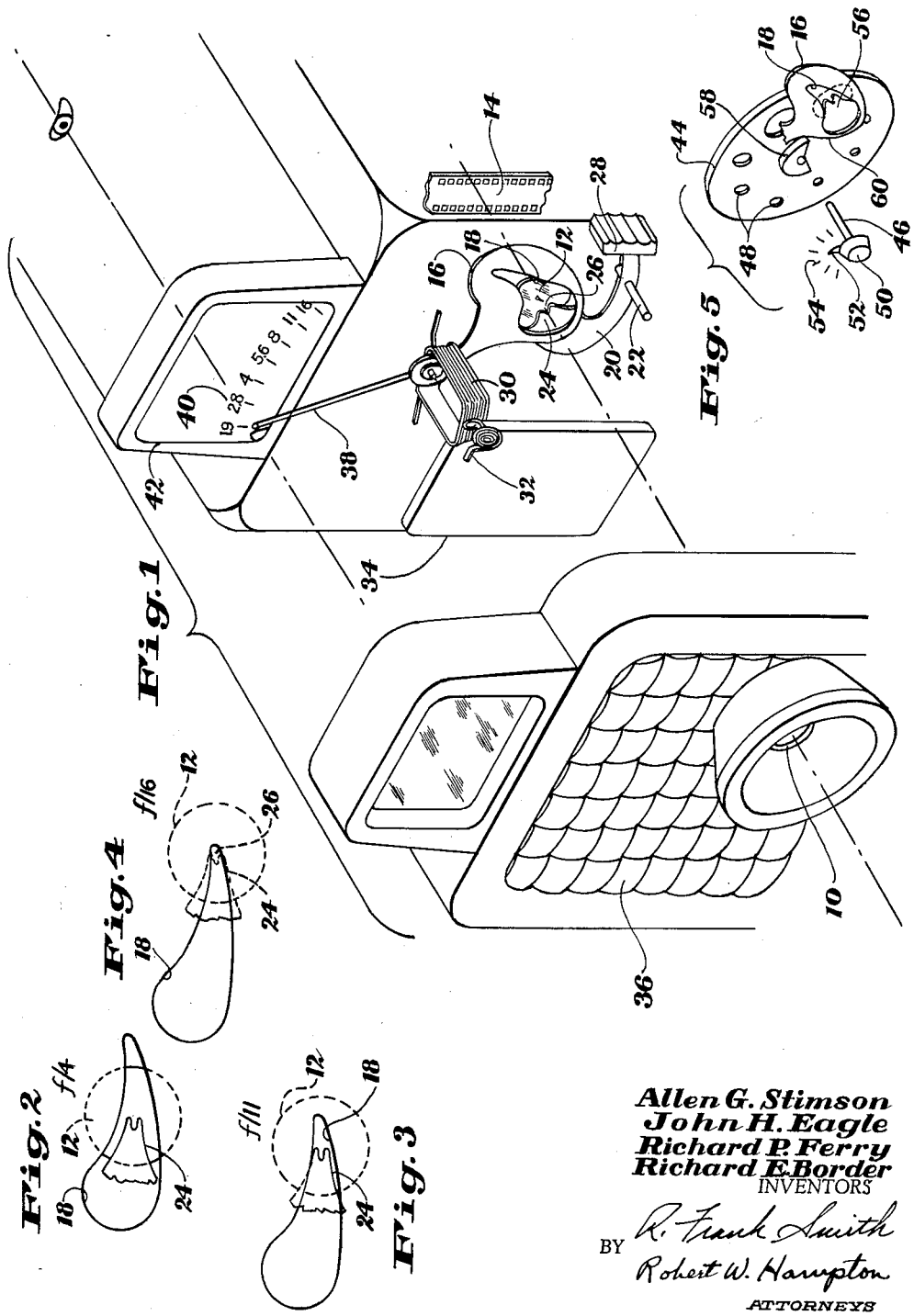
*Allen G. Stimson*
*John H. Eagle*
*Richard P. Ferry*
*Richard E. Border*
INVENTORS
BY R. Frank Smith
Robert W. Hampton
ATTORNEYS

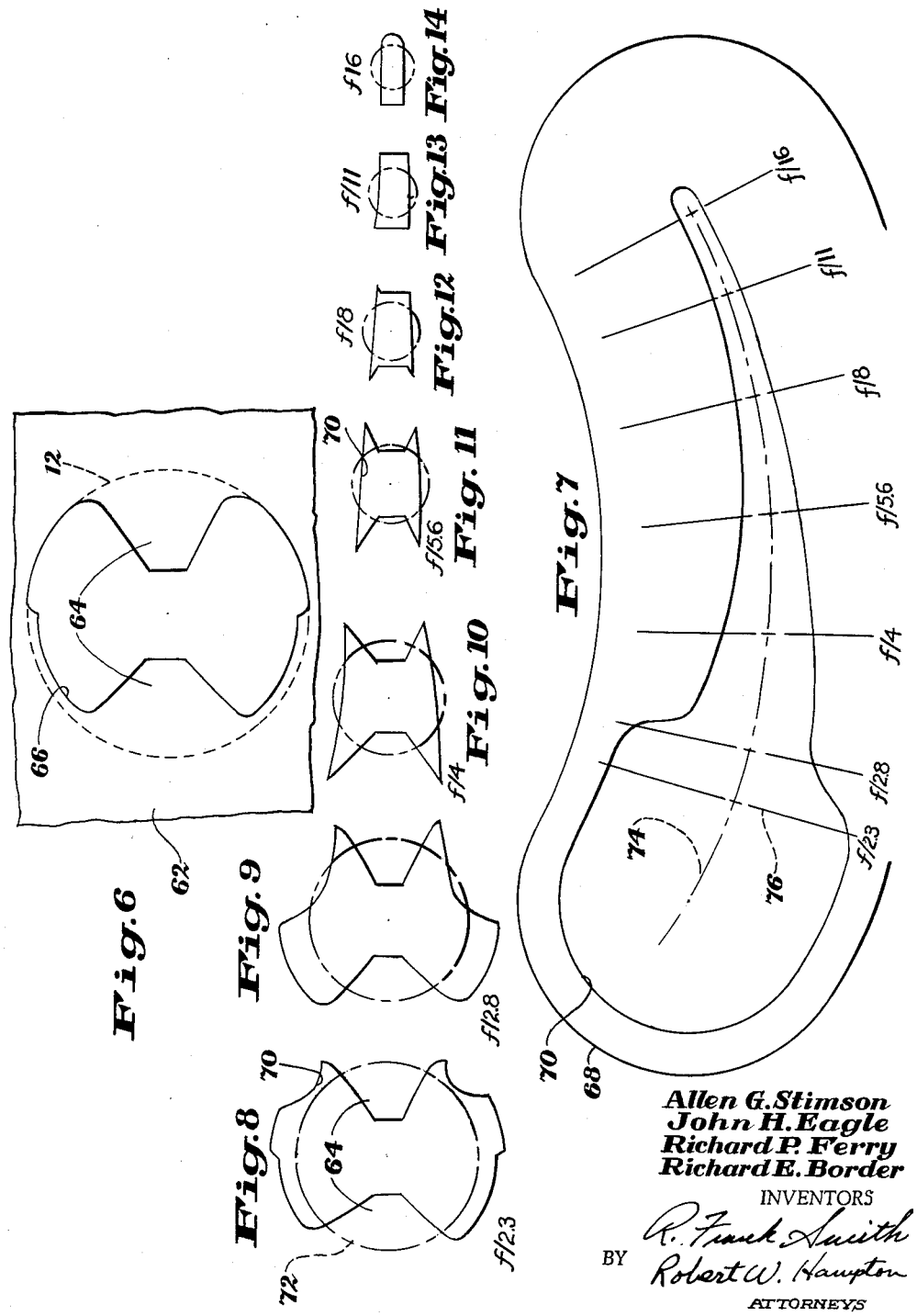

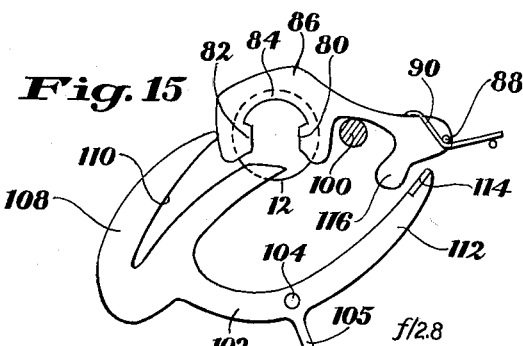
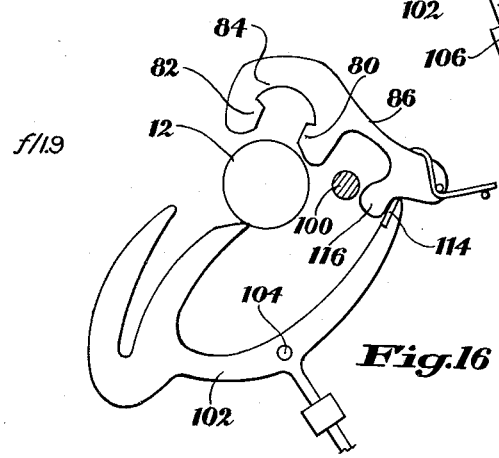
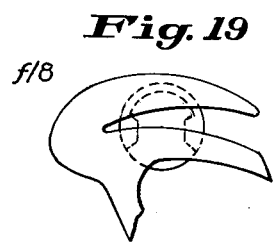
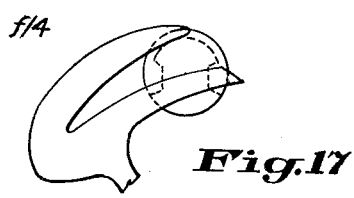
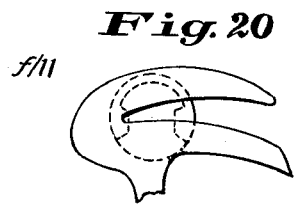
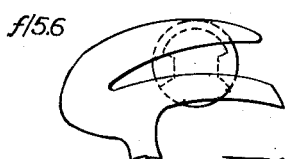

United States Patent Office

3,033,093
Patented May 8, 1962

3,033,093
AUTOMATIC EXPOSURE CONTROL SYSTEM
Allen G. Stimson, John H. Eagle, Richard P. Ferry, and Richard E. Border, Rochester, N.Y., assignors to Eastman Kodak Company, Rochester, N.Y., a corporation of New Jersey
Filed June 30, 1958, Ser. No. 745,469
17 Claims. (Cl. 95—64)

The present invention relates to diaphragms for photographic cameras and more particularly relates to improved constructions for diaphragms that are automatically regulated in response to changes in light intensity.

It is a common practice in motion picture and still cameras to automatically regulate the size of a diaphragm opening as a function of the brightness of a scene that is to be photographed. Such regulation is usually referred to as automatic exposure control and typically employs a photocell for receiving light from the scene, a permanent-magnet moving-coil instrument energized by the cell, and a diaphragm mechanism coupled to the moving coil of the instrument. The current output of the cell varies with the intensity of light on it and in turn varies the energization of the instrument to adjust the diaphragm mechanism as a function of the light intensity.

One of the simplest diaphragm mechanisms comprises a plane-polarized disk that moves with the coil of the instrument and is aligned with a second plane-polarized disk and a fixed aperture in the light path of the camera. The moving coil adjusts the angle between the polarization planes of the two disks and thereby adjusts the amount of light admitted into the camera. This diaphragm mechanism, although simple and relatively rugged, is limited in its utility because it always uses the maximum aperture area of the camera and therefore provides a minimum depth of focus.

A second diaphragm mechanism, in which the aperture area is varied and which therefore provides a greater depth of focus as the admission of light is more restricted, comprises a single diaphragm vane moving with the instrument coil and having a generally teardrop- or V-shaped aperture that cooperates with a fixed aperture in the light path of the camera. As the coil moves in response to increased intensity of the incident light, the vane superimposes a narrower portion of its aperture over the fixed aperture. However, for settings of the single vane corresponding to middle and high values of light intensity, the moving aperture constitutes either a narrow slit that completely crosses the fixed aperture or a small opening on one side of the fixed aperture; therefore, a substantial portion of the composite aperture overlies peripheral areas of the lens elements in the camera.

It is well known in the art that the use of the peripheral areas of the usual camera lens tends to degrade both the optical definition of the image and the uniformity of the light distribution in the focal plane. In order to overcome this objection many moving vane systems have been proposed in which two or more vanes, each having a teardrop- or V-shaped aperture are moved in opposition to each other, either by a single instrument that is geared or otherwise coupled to both vanes, or by a plurality of instruments, one for each of the vanes. It is immediately obvious that the cost, complexity, size, weight and frequently the delicacy of such systems are increased along with the use of more than one moving vane, regardless of whether one or a plurality of instruments are used to drive the vanes.

It is therefore a principal object of the present invention to automatically control the aperture area of a camera by means of a single electrical instrument driving a single diaphragm vane having an aperture that cooperates with a fixed aperture to form a composite, variable aperture, the major proportion of whose area is centrally located with respect to the fixed aperture for all diaphragm settings.

A more specific object of the invention is to partially mask the fixed aperture of a camera to complement the variable masking due to an apertured diaphragm vane that is moved across the fixed aperture in response to variations in light intensity.

Other objects of the invention are:
To provide a manually removable partial mask over the fixed aperture of a camera;
To provide a series of apertures of fixed graduated area with means for selectively aligning any of said apertures with the light path of a camera, in combination with a movable diaphragm vane that is automatically positioned in response to changes in light intensity and means for disabling the automatic positioning of the movable vane in response to the alignment of a predetermined one of the fixed-area apertures with the light path of the camera;
To provide a partial mask for the fixed aperture of a camera, wherein the mask comprises a plurality of generally V-shaped members having their apexes extending toward the central area of the fixed aperture; and
To provide a partial mask for the fixed aperture of a camera, wherein a movable diaphragm vane with a generally V-shaped aperture is adapted to cooperate with the fixed aperture to form a composite, variable aperture, with a cooperative relation between the mask and the vane for removing the mask from the fixed aperture at a predetermined position of the vane.

Other objects of the invention will appear from the following description, reference being made to the accompanying drawings, wherein:

FIG. 1 is an exploded perspective view of a motion picture camera showing the physical arrangement of the parts of a first embodiment of the invention;

FIGS. 2, 3 and 4 illustrate the relative positions of the fixed and movable apertures and the mask of FIG. 1 at typical aperture values;

FIG. 5 is an exploded perspective view of a manual override mechanism for disabling the automatic exposure control system of the camera;

FIG. 6 shows a second form of mask for the fixed aperture of a camera;

FIG. 7 shows a moving diaphragm vane and its aperture for cooperation with the fixed aperture and mask of FIG. 6;

FIGS. 8–14, inclusive, illustrate the relative positions of the fixed and movable apertures and the mask of FIGS. 6 and 7 at typical aperture values;

FIG. 15 shows a third form of mask for the fixed aperture of the camera and shows a movable diaphragm vane adapted to cooperate with the fixed aperture and mask;

FIG. 16 shows the cooperative relation between the mask and the vane of FIG. 15, whereby the mask is removed from the fixed aperture at maximum-light settings of the diaphragm; and FIGS. 17–21, inclusive, illustrate the relative positions of the fixed aperture, the mask and the diaphragm vane of FIGS. 15 and 16 at typical aperture values.

Referring to FIG. 1, the invention is illustrated in the environment of a motion picture camera, although it is understood that it may be used equally well in a still camera. Light enters the camera and is focussed on the film 14 through an optional front lens element 10 and a rear lens element 12, the latter of which constitutes a fixed aperture. The amount of light transmitted through the fixed aperture 12 is controlled by the position of a diaphragm vane 16, which is formed preferably of thin aluminum and has an elongated and curved teardrop-shaped aperture 18 overlying aperture 12. A lever 20 is pivoted on a shaft 22 closely parallel to vane 16, and has on one end a mask 24, which has the general shape of an inverted V. Mask 24 overlies a segment of aperture 12 extending from the periphery of that aperture to approximately its center. Preferably, the area of the mask is somewhat less than half the area of aperture 12. The extreme end of the mask may be indented, as shown at 26, for a reason to be explained hereinafter.

Diaphragm vane 16 is mounted on a coil 30 of a galvanometer-type electric instrument and rotates with the coil to align various portions of aperture 18 with the fixed aperture 12. Coil 30 and its instrument are well known in the art and are shown, for example, in U.S. Patent 1,927,346, granted September 19, 1933, to L. E. Lawrence. Coil 30 receives energizing voltage through a pair of control springs, one which is shown at 32, from a photosensitive element 34 which may be of the usual photovoltaic type. Element 34 is exposed to the viewed scene through a lenticular lens system 36. It is well known that the angular position assumed by a pivoted moving coil of an electric measuring instrument, such as coil 30 of FIG. 1, connected to the output of a photovoltaic element, such as element 34, is a function of the intensity of the light incident on the photosensitive element. The disposition of diaphragm vane 16 relative to aperture 12 is such that the width of the portion of aperture 18 aligned with aperture 12 by the movement of coil 30 is an inverse function of the intensity of the light incident on element 34.

A pointer 38 is integral with coil 30 and is rotated thereby for cooperation with an aperture scale 40 in a viewfinder 42 of the camera. For simplicity of illustration, scale 40 is shown as a reversed image of its usual appearance from the front of the camera.

Referring again to mask 24, it will be seen that for the higher aperture values, corresponding to the smaller diaphragm openings, the mask cooperates with vane 16 to form a composite aperture which is substantially centralized over the fixed aperture 12. The centralization of the composite aperture is shown particularly in FIGS. 3 and 4, wherein vane 16 is illustrated in its approximate positions for aperture values of f/11 and f/16, respectively. It will be apparent that in the absence of mask 24, vane 16 would have to be moved further to the left for each of these aperture values and would have to cooperate with the lefthand periphery of the fixed aperture 12, thereby limiting the light path primarily to a peripheral portion of aperture 12, which is undesirable for the reasons previously set forth.

In FIG. 4, in particular, it can be seen that the relieved portion 26 of mask 24 cooperates with the extreme inner surface of aperture 18 to form a centralized, composite aperture for the smallest diaphragm openings.

FIG. 2 illustrates the relative positions of apertures 12 and 18 and mask 24 for one of the larger diaphragm openings. Although in this case a considerable portion of the peripheral areas of aperture 12 is used in the light path, this portion is not as great as it would be in the absence of the mask.

When the intensity of the viewed light is at so low a value that it corresponds to an aperture value below the limit of scale 40, mask 24 may be manually rotated away from aperture 12 by means of a finger knob 28 (FIG. 1). For this purpose lever 20 is frictionally rotatable about its shaft 22. If it is deemed unnecessary to remove mask 24 from aperture 12, lever 20 may be eliminated and the mask may be formed as a fixed member; for example, it may constitute an extension from the periphery of aperture 12.

FIG. 5 illustrates one form of structural organization by means of which the automatic operation of the diaphragm vane of FIG. 1 may be overridden manually for setting the diaphragm opening at any of a series of selected values. A disk 44 that is pivoted at its center along with a shaft 46 has a series of circular apertures 48 of graduated areas arranged with their centers at equal radial distances from shaft 46. Disk 44 is mounted on the camera by shaft 46 at a position such that a circle passing through the centers of apertures 48 also passes through a line normal to the center of the fixed lens aperture 12 (FIG. 1). A knob 50 (FIG. 5) integral with shaft 46 may be used to rotate the shaft and disk for aligning any of the apertures 48 with aperture 12. Knob 50 may be provided with a pointer 52 to cooperate with an aperture scale 54 which is conveniently located on an outside surface of the camera.

Each of the two largest apertures 48 on disk 44 has approximately the same diameter as the fixed aperture 12 of the camera and one of these is provided with a mask 56 shaped like the previously described mask 24, shown in FIG. 1. When the masked aperture 48 is aligned with aperture 12 its mask 56 performs the function of mask 24, and the cooperative relation between the mask, the fixed aperture 12 and the moving vane 16 is the same as described above in relation to FIG. 1. When disk 44 is rotated to any other position, i.e., when any aperture 48 other than the masked one is aligned with aperture 12, a cam 58, which is integral with and approximately centered on the disk, cooperates with a lower surface 60 of diaphragm vane 16 and maintains the vane in a position wherein the maximum-width portion of its aperture 18 is aligned with aperture 12, thereby preventing any automatic positioning of the vane. In this case, the size of the aperture 48 aligned with aperture 12 controls the amount of light admitted into the camera, and the aperture value can be read from scale 54 rather than from scale 40. The structure shown in FIG. 5 is claimed in the copending application Serial No. 812,477, filed May 11, 1959, which is a division of the present application.

FIG. 6 illustrates a second masking structure that has been found to provide a better centralization of the composite aperture than the mask shown in FIGS. 1 to 5. A member 62, which corresponds to lever 20 of FIG. 1, has integral therewith a pair of opposed masks 64, each of which has the general shape of a V with a truncated apex. The apexes of the masks extend toward each other from opposed peripheral areas of the fixed aperture 12 in the camera and form a somewhat hourglass-shaped aperture 66 centralized over aperture 12. FIG. 7 shows a moving diaphragm vane 68 having an aperture 70 in the general shape of a stepped teardrop, adapted for cooperation with masks 64 and aperture 12 to control the admission of light into the camera. Vane 68 may be moved in the manner previously described in relation to vane 16 of FIG. 1, and member 62 may be rotated to remove masks 64 from aperture 12 as previously described in relation to lever 20 of FIG. 1.

FIGS. 8-14, inclusive, show the shapes of the composite apertures formed when vane 68 is rotated to various positions over mask 64. Each broken-line circle 72 in FIGS. 8-14 represents the ideal circular aperture having the same area as the composite aperture in that drawing. The position of vane 68 in each of FIGS. 8-14 is determined by the coincidence of the center of the circle 72 and the intersection of the curved center line 74 (FIG. 7) of aperture 70 and a line 76 normal to line 74. Each line 76 is designated by an aperture value corresponding to an aperture value assigned to one of the drawings of FIGS. 8-14. It will be seen that each composite aperture remains well centralized with respect to masks 64 and therefore with respect to the fixed aperture 12 (FIG. 6) of the camera.

FIG. 15 illustrates a third form of masking structure wherein two masks 80 and 82 are similar in shape and location, relative to the fixed aperture 12, to masks 64 shown in FIG. 6. Masks 80 and 82 are joined by an arcuate third mask 84 and all three of the masks are integral with a lever 86 which is pivoted at 88. A spring 90 normally maintains lever 86 against a fixed stop 100 as shown in FIG. 15.

A diaphragm vane 102 is rotated about a pivot 104, as previously described, and has three arms. A first arm 105 carries a counterweight 106. A second arm 108 has an aperture in the general shape of a curved V, which cooperates with the fixed aperture 12 and with masks 80, 82 and 84 to form a composite aperture for controlling the admission of light into the camera. A third arm 112 of vane 102 carries an ear 114 which cooperates with an arm 116 on the mask lever 86. When vane 102 is rotated to its maximum-aperture position, ear 114 engages arm 116 and rotates lever 86 clockwise, as shown in FIG. 16, to remove all three of the masks from the light path of the camera. When vane 102 is in any of its positions corresponding to smaller apertures, as shown in FIGS. 15 and 17–21, there is no contact between ear 114 and arm 116, and spring 90 (FIG. 15) maintains the masks 80, 82 and 84 in their positions covering the edges of aperture 12. It will be seen that the addition of the arcuate third mask 84 improves the centralization of the composite aperture for most diaphragm openings and that the removal of the masks at the maximum aperture value enables full use of the fixed aperture.

The invention has been described in detail with particular reference to preferred embodiments thereof, but it will be understood that variations and modifications can be effected within the spirit and scope of the invention as described hereinabove and as defined in the appended claims.

We claim:

1. Variable diaphragm apparatus for defining the exposure aperture of the taking lens of a camera, said lens having a first zone producing relatively good optical definition and a second zone producing relatively poor optical definition, said apparatus comprising in combination: a movable diaphragm member having an elongated, tapered aperture; means for moving said member within a range throughout which the optical axis of said lens passes through said elongated aperture; and a mask adapted to occupy a fixed position during at least part of the movement of said diaphragm member, said mask in its fixed position covering a portion of said second lens zone in alignment with said tapered aperture, thereby defining, for said lens, exposure apertures having higher ratios of first-zone to second-zone lens area than exposure apertures of corresponding sizes defined for said lens solely by said tapered aperture.

2. The apparatus defined in claim 1, wherein said mask covers less than half of the area of said lens.

3. The apparatus defined in claim 1, wherein said mask includes a generally V-shaped member having an apex extending generally toward the optical axis of said lens.

4. The apparatus defined in claim 3, wherein the apex of said V-shaped member is indented.

5. Variable diaphragm apparatus for the taking lens of a camera, comprising: a movable diaphragm vane having an elongated, tapered aperture; means for moving said vane within a range, in each position of which the optical axis of said taking lens passes through said tapered aperture; and means cooperating with said vane to define exposure apertures more centralized with respect to said optical axis than exposure apertures of corresponding sizes defined solely by the portion of said tapered aperture optically aligned with said lens, said last-named means comprising a mask having a normal position in alignment with said elongated aperture and covering a peripheral portion of said lens, said mask being adapted to remain in its normal position while said vane is moved through at least a part of said range.

6. The apparatus defined in claim 5, having manually operable control means cooperating with said mask for selectively moving the latter away from said normal position in order to uncover said peripheral portion of said lens.

7. The apparatus defined in claim 5, with: a first control surface on said mask; and a second control surface on said vane adapted to engage said first control surface, when said vane moves to a predetermined position, for moving said mask away from said normal position in order to uncover said peripheral portion of said lens.

8. Variable diaphragm apparatus for the taking lens of a camera, comprising in combination: a movable diaphragm member having an elongated, tapered aperture; means for moving said member within a predetermined range throughout which the optical axis of said taking lens passes through said tapered aperture; and means cooperating with said diaphragm member to define exposure apertures of said lens having overall optical properties superior to those of exposure apertures of corresponding sizes defined by the entire lens area optically aligned with said tapered aperture, said last-named means comprising a pair of masking members normally disposed in fixed positions covering peripheral areas of said lens on opposite sides of said optical axis and in substantial alignment with said tapered aperture, said masking members being adapted to remain in said fixed positions when said diaphragm member is moved through at least a part of said range.

9. The apparatus defined in claim 8, wherein each of said masking members is substantially V-shaped and has a respective apex extending generally toward the optical axis of said lens.

10. The apparatus defined in claim 9, wherein the apex of each of said masking members is truncated.

11. The apparatus defined in claim 9, with an arcuate third masking member interconnecting said two masking members and overlying a peripheral area of said lens.

12. In a camera having a taking lens, a photoelectric cell adapted to be exposed to light from the exterior of the camera, and an electric instrument connected to said cell and energized thereby in proportion to the intensity of said light, said instrument including a movable coil having an initial position and being moved away from said initial positon as a function of the energization of said instrument, automatically variable diaphragm apparatus for defining an exposure aperture of said taking lens, comprising in combination: a diaphragm vane having an elongated, tapered aperture, said vane being coupled to said coil and movable thereby within a predetermined range throughout which the optical axis of said lens passes through said aperture; and means for increasing the ratio of axial to peripheral lens area within the lens portion optically aligned with said exposure aperture, relative to the entire lens portion optically aligned with said tapered aperture, said last-named means comprising a mask having a normal position aligned with said tapered aperture and with a peripheral portion of said lens, said mask being adapted to remain fixed in said normal position when said vane is moved through at least part of said range.

13. The apparatus defined in claim 12, wherein said mask includes a substantially V-shaped member having an apex extending generally toward the axial area of said lens when said mask is in its normal position.

14. The apparatus defined in claim 13 wherein the apex of said V-shaped member extends generally in the direction of decreasing width of said tapered aperture when said mask is in its normal position.

15. In a camera having a lens and a photoelectric cell, an exposure-aperture control comprising a first exposure-aperture control member adapted to be adjusted relative to said lens in response to changes in the amount of light impinging on said cell, said first exposure-aperture control member having an arcuate opening therein, and a second exposure-aperture control member fixedly disposed relative to said lens, said second exposure-aperture control member having an opening provided with at least one inwardly projecting masking member aligned with the arcuate opening in said first exposure-aperture control member.

16. Variable diaphragm apparatus for the taking lens of a camera, comprising in combination: a movable diaphragm member having an elongated, tapered aperture; means for moving said member within a predetermined range throughout which the optical axis of said taking lens passes through said tapered aperture; and means cooperating with said diaphragm member to define exposure apertures of said lens having optical properties superior to such optical properties of exposure apertures of corresponding sizes defined by the entire lens area optically aligned with said tapered aperture, said last-named means comprising at least one masking member normally disposed in a fixed position covering a peripheral area of said lens in substantial alignment with said tapered aperture, said masking member being adapted to remain in said fixed position when said diaphragm member is moved through at least a part of said range.

17. Variable diaphragm apparatus for the taking lens of a camera, comprising: a movable diaphragm vane having an elongated, tapered aperture; means for moving said vane within a range, in each position of which the optical axis of said taking lens passes through said tapered aperture; and means cooperating with said vane to define exposure apertures more centralized with respect to said optical axis than exposure apertures of corresponding sizes defined solely by the portion of said tapered aperture optically aligned with said lens, said last-named means comprising a fixed mask aligned with said elongated aperture and covering a peripheral portion of said lens.

References Cited in the file of this patent
UNITED STATES PATENTS

| | | |
|---|---|---|
| 2,013,362 | Rizdorfer | Sept. 3, 1935 |
| 2,145,427 | Morris | Jan. 31, 1939 |
| 2,163,737 | Prinsen | June 27, 1939 |
| 2,556,546 | Lee | June 12, 1951 |
| 2,580,324 | Schwarz | Dec. 25, 1951 |
| 2,841,064 | Bagby et al. | July 1, 1958 |